United States Patent [19]

Brehm

[11] 4,136,050

[45] Jan. 23, 1979

[54] DUST SUPPRESSION METHOD AND COMPOSITION

[75] Inventor: Gary A. Brehm, Churchville, Pa.

[73] Assignee: Betz Laboratories, Inc., Trevose, Pa.

[21] Appl. No.: 769,087

[22] Filed: Feb. 16, 1977

[51] Int. Cl.² .............................................. C09K 3/22
[52] U.S. Cl. ................................ 252/88; 252/DIG. 1; 299/12; 404/76
[58] Field of Search .................... 252/88, 89, 99, 135, 252/DIG. 1; 299/12; 404/76; 55/84; 98/50

[56] References Cited

U.S. PATENT DOCUMENTS

| | | | |
|---|---|---|---|
| 2,538,199 | 1/1951 | Jefferson | 252/88 |
| 2,786,815 | 3/1957 | Buggisch | 252/88 |
| 3,156,655 | 11/1964 | Bright | 252/109 |
| 3,248,335 | 4/1966 | Teot | 252/558 |
| 3,549,539 | 12/1970 | Mallows | 252/99 |
| 3,954,662 | 5/1976 | Salyer | 252/88 X |

FOREIGN PATENT DOCUMENTS

| | | | |
|---|---|---|---|
| 1946168 | 3/1971 | Fed. Rep. of Germany | 252/88 |
| 965215 | 7/1964 | United Kingdom | 252/DIG. 1 |

OTHER PUBLICATIONS

Schönfeldt, N.: *Surface Active Ethylene Oxide Adducts*, Pergamon Press, New York, 1969, pp. 603, 604, 629 & 630.

*McCutcheon's Detergents & Emulsifiers* – 1970 Annual, published by Allured Publishing Co., 1970, p. 176.

*Primary Examiner*—Dennis L. Albrecht
*Attorney, Agent, or Firm*—Alexander D. Ricci; Steven H. Markowitz

[57] ABSTRACT

The dissemination of fugitive dust particles into the atmosphere is reduced by treating the particles with an aqueous solution of octylphenoxy polyethoxy ethanol and copolymer of ethylene oxide and propylene oxide.

21 Claims, 7 Drawing Figures

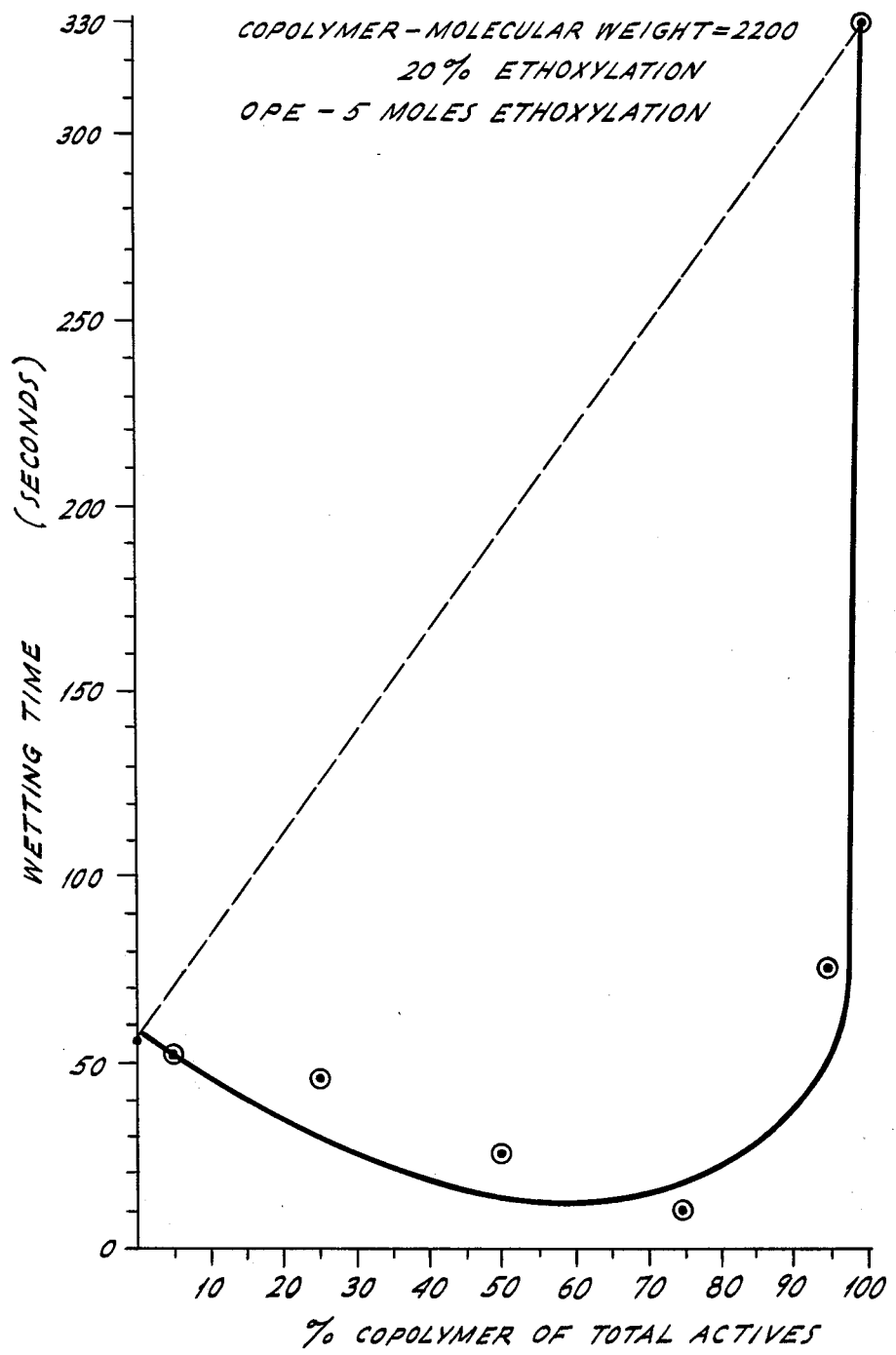

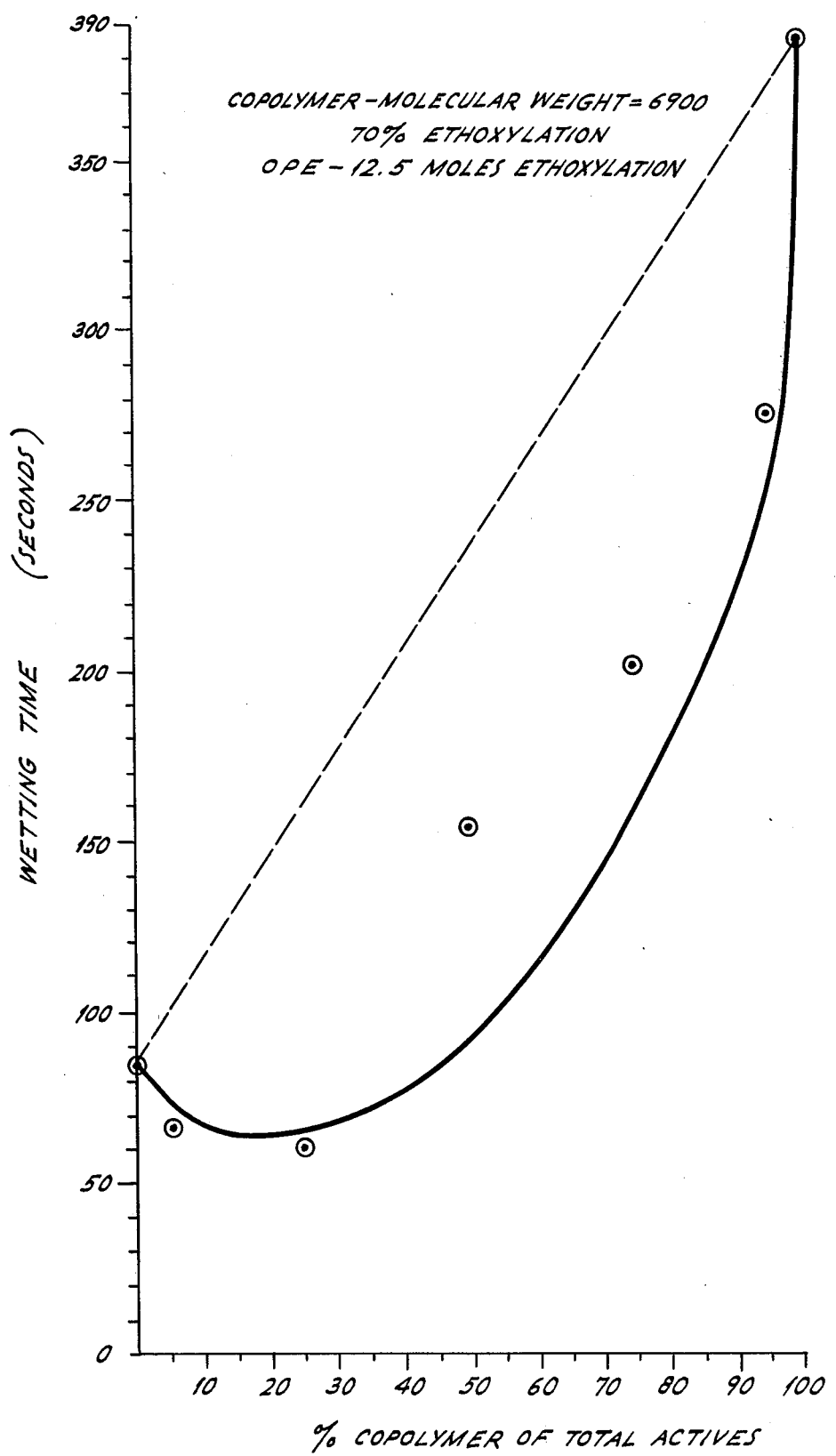

DUST SUPPRESSION METHOD AND COMPOSITION

DISCLOSURE OF THE INVENTION

The present invention relates to a method and composition for preventing the dissemination of fugitive dust particles into the atmosphere and particularly to such particles which are hazardous to the environment and/or personal health and safety.

Indeed, the presence of airborne particulate matter poses a serious hazard with respect to both the environment in general and personal health and safety in particular. For example, wind errosion of mine tailings has seriously disrupted normal living in the vicinity of mining localities. This dust contaminates food, potable water sources and fertile soils and, in some instances, interferes with the driving of automobiles on adjacent highways. In addition, airborne particles from any given source are often inhaled, resulting in serious respiratory ailments such as silicosis.

Common industrial sources of such fugitive dust have been categorized as open operations, leaks and spills, storage and disposal, an incompletely controlled point and poor housekeeping. The iron and steel industries are replete with examples of these enumerated categories. For example, in the recent past, a well known steel mill was ordered by a court to install a system to control the dust, smoke and sparks from its electrical furnace shop. These fugitive particles emanated from what would best be categorized as the "open operations" source noted above. The above-noted disposal and storage source of fugitive dust is exemplified by the facts surrounding the use of a steel mill open hearth precipitater which has an electrostatic precipitator to control dust emissions. (These dust emissions would be categorized as the controlled point-type noted above.) The dust removed by the electrostatic precipitator is typically collected in hoppers and periodically dumped into essentially closed containers known as "collecting pans". Despite the fact that connecting hoses are extended between the hopper and collecting pan, considerable fugitive dust emissions occur during material transfer. If the electrostatically removed particulate matter is to be used as landfill, severe fugitive dust emissions can occur during the dumping and natural winds have been observed creating great dust clouds at the landfill sight. The transportation of particulates along conveyor belts and the dumping of the particulates therefrom also create fugitive dust emission problems of the "transportation and disposal" source type. The "leaks and spills" and "poor housekeeping" sources of fugitive dust emissions are seen to be self-explanatory and, thus, further explanation of these categories is considered unwarranted.

As already noted above, the present invention is related to a method and composition for preventing the dissemination of fugitive dust into the atmosphere. There already exist both mechanical and chemical methods for preventing particulate matter from becoming airborne. In the above-noted steel mill electrical furnace shop a system of hoods was installed on the furnace and suction fans pull the exhaust through the roof into one large duct of over twenty feet in diameter. The exhaust is blown into a bag house where harmful particulates are filtered out. These "mechanical" systems are seen to have the inherent drawbacks of being cumbersome and extremely expensive. Chemical-type controls have been generally limited to two basic types, crusting agents and water types. The water-type controls are aimed at preventing dust particles from becoming airborne by keeping them wet. A few industries have used a water spray-type control with surface tension reducers to increase the wettability of the particles. Of course, the more easily a particle becomes wetted, the more effective the treatment is considered to be.

According to the present invention, the wettability of fugitive dust particles, and thus the prevention of the dissemination of such dust to the atmosphere, is considerably enhanced by applying thereto an effective amount for the purpose of an aqueous solution of octylphenoxy polyethoxy ethanol (hereinafter referred to as OPE) and copolymer of ethylene oxide and propylene oxide (hereinafter referred to as copolymer). It was discovered by the present inventor that the benefits derived from the combination of the two compounds exceeded the benefits derived from the use of either compound alone with respect to wetting dust particles and, therefore, reducing fugitive dust loads.

BRIEF DESCRIPTION OF THE DRAWINGS

FIGS. 1 through 7 are plots of penetration time (a measure of dust wetting ability) vs. the proportion of copolymer in mixtures of the claimed combination of wetting agents. The drawings show that compositions within the scope of this invention possess better-than-expected ability to wet dust particles.

DETAILED DESCRIPTION OF THE INVENTION

Figure 3:
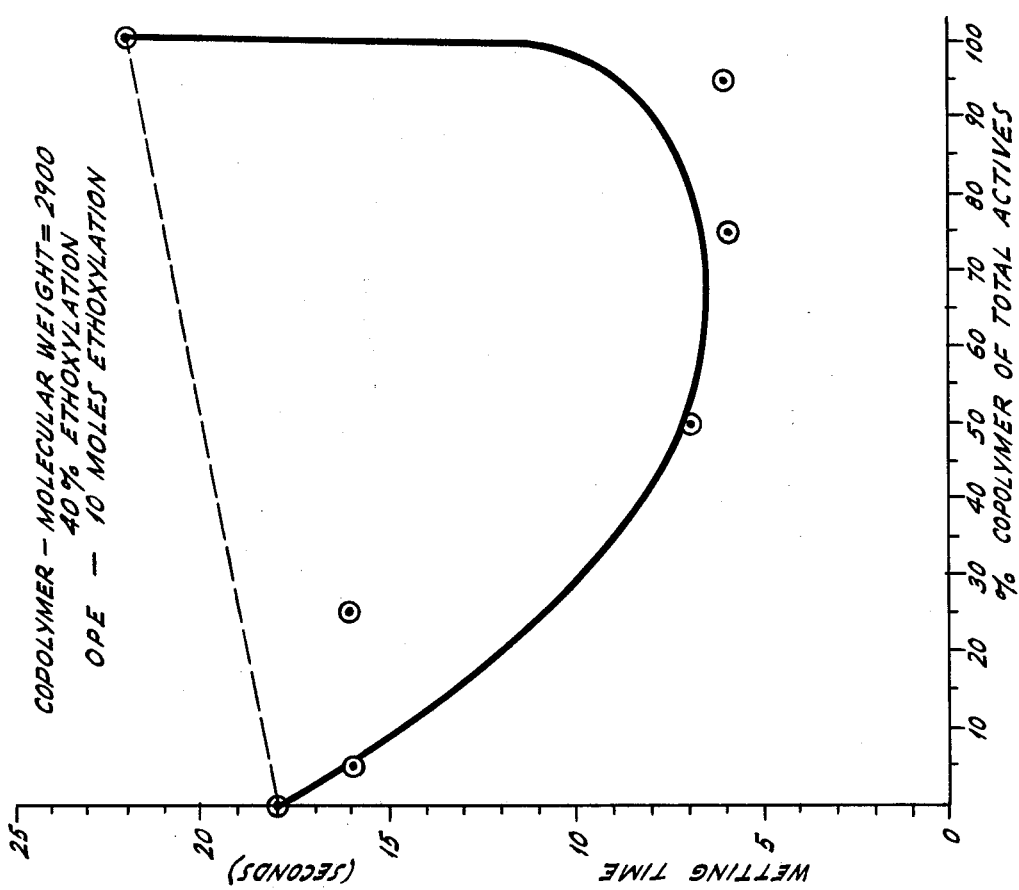

The copolymer is a block copolymer of ethylene oxide and propylene oxide. The preparation of the copolymer is well known in the art as evidenced by U.S. Pat. No. 2,674,619 which patent is herein incorporated by reference. As is quite evident from the test results reported below, a wide molecular weight range of copolymer was tested in combination with the OPE with enhanced results with respect to particle wetting. The upper limit for the molecular weight would accordingly be determined only by its solubility in the aqueous solvent. Although a copolymer having a molecular weight of about 16,000 was tested, some difficulty was experienced getting it into solution. Accordingly, a molecular weight of about 16,000 could be considered as the upper limit for the copolymer. The preferred upper limit for the molecular weight is about 13,300. U.S. Pat. No. 2,674,619 indicates that when the molecular weight of the propylene oxide portion of the copolymer is less than 900, the copolymer has low surfactant efficacy. Since the present inventor considers the surfactant properties of the copolymer to be important to the operativeness of the present invention it is his opinion that about 1000 could be considered the lower molecular weight limit for the copolymer. The preferred lower limit is about 1950.

The inventive composition also proved to be effective over a wide range of ethylene oxide content in the copolymer. To the best of the present inventor's knowledge, 10% ethylene oxide in the copolymer is the lowest ethylene oxide content (ethoxylation) commercially available. A fugitive dust particle treatment using the 10% ethylene oxide copolymer proved to be effective, and, therefore, that could be considered the lower limit for the ethylene oxide content. Likewise, to the best of the present inventor's knowledge, 80% ethoxylation in the copolymer was the highest available and proved to be effective despite some problems with getting the copolymer into solution. Accordingly, 80% ethoxylation could be considered the upper limit for the ethylene oxide content of the copolymer. The preferred upper limit is 70% ethoxylation.

The ethanol compound is best described as octylphenoxy polyethoxy ethanol (OPE) having the general formula:

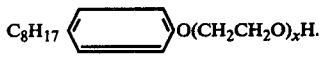

As can be seen from the formula, x represents the number of moles of ethylene oxide in the compound. As will become evident from the test results reported below, a wide range of x values was tested successfully. Since at x = 5 the OPE was water soluble (values below 5 were not), about 5 moles of ethylene oxide in the compound is the preferred lower limit. The upper limit for x would be determined by the capability of making the compound. To the best knowledge of the present inventor 40 moles of ethylene oxide is the highest content that has been made and/or is comercially available. Accordingly, 40 moles of ethylene oxide in the OPE could be considered the upper limit. The inventive composition comprises a combination of the OPE and the copolymer in a weight ratio of from about 5/95 to 95/5 in aqueous solution. Of course the amount of treatment would depend on the nature and severity of the problem to be treated. In any event, on the basis of adding the inventive composition to a known water treatment system such as the above-noted water-spray systems, as little as about 0.005% by weight of actives (OPE and copolymer) in the aqueous solution should be effective. The preferred lower limit is about 0.01% active, while about 0.05% is considered the most desirable lower limit. About 6% actives by weight could be considered the upper limit for the concentration of OPE and copolymer in the treatment solution. Because higher concentrations present stability problems and become impractical on a cost basis, about 2% is the preferred upper limit and about 1% actives is considered to be the most desirable upper limit.

The preferred method for applying the inventive composition to the dust particles is by spraying. For example, a ring of sprays has been used at the Basic Oxygen Furnace (BOF) of a midwestern steel company. The dust (particulate matter) from the discharge of the furnace was collected by an electrostatic precipitator located at the top of the furnace. The dust removed by the precipitator was transferred to a silo from which it was dumped into railroad cars. The ring of sprays was located between the silo and the railroad cars and the dust was dumped through the ring. The ring consisted of six spray nozzles, each having a full cone spray pattern covering about 75 degrees of arc. Together, the nozzles were capable of providing up to 600 gallons of liquid per hour. Of course the nozzle type and arrangement will vary depending on the particular problem to be treated. For example, a second company used a series of conveyor belts to convey up to 9000 tons of particulate matter (dust) per day. At various "transfer points" the dust was dumped from one conveyor belt to another creating serious fugitive dust problems. A single spray nozzle at one of the transfer points proved to be sufficient in treating the dust. Since the various nozzle arrangements are considered clearly within the skill of the art, further details pertaining thereto are deemed unnecessary. The OPE and copolymer could of course be fed full strength from separate sources into the water feed of the spray nozzles or they could be premixed and/or prediluted.

EXAMPLE 1

The octylphenoxy polyethoxy ethanol component of the inventive composition is well known in the art as is the preparation thereof. One method for preparing it is disclosed in the literature as follows:

There are added to a reaction vessel 412 parts of octylphenol and two parts of sodium hydroxide. The system is swept with nitrogen and the reaction mixture is heated to 139° C. at which point ethylene oxide is introduced. A total of 817.1 parts of ethylene oxide is added over a period of five and one-half hours while the temperature is held at 170° to 185° C. the ethanol compound formed has the formula:

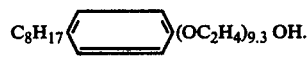

In Examples 2-8 which are reported below, the inventive composition was tested for relative dust wetting activity. As already stated above, the more easily a particle becomes wetted, the more effective a fugitive dust treatment is considered to be. Thus, the test evaluated the effectiveness of a given treatment by how rapidly (easily) it wets the dust.

Samples of fugitive dust were obtained from various industrial sources. A small portion of each dust sample (½ gram) was placed on a depression plate and leveled with a spatula. A drop of the treatment solution was placed on the sample and the time required to penetrate into the dust was measured. The penetration times were found to be reproducible within 15%. Since penetration becomes more difficult as the particle size decreases a small particle size of −400 mesh was selected for purposes of this evaluation. Also, the results obtained in these tests were found to correlate well with actual field trials. That is, efficacy of a treatment in the field was predictable from these test results.

EXAMPLE 2

The industrial dust sample utilized in this test was sinter dust. Of course, sintering in the steel industry is a process in which iron-bearing materials of a fine particle size are converted into course agglomerates by partial fusion. The treatment composition was an aqueous solution of OPE having 5 moles of ethoxylation and copolymer having a molecular weight of 2200 and 20% ethoxylation. The aqueous solution contained 1% total actives by weight. The results are considered to be self-explanatory and are reported below in Table 1 and in FIG. 1 of the accompanying drawings in terms of penetration time vs. composition.

TABLE 1

| Copolymer: MW=2200 20% ethoxylation Ratio OPE/Copolymer | OPE: 5 moles ethoxylation Penetration time (seconds) |
|---|---|
| 100/0 | 56 |
| 95/5 | 52 |
| 75/25 | 47 |
| 50/50 | 26 |
| 25/75 | 10 |
| 5/95 | 73 |

TABLE 1-continued

| Copolymer: MW=2200 20% ethoxylation | OPE: 5 moles ethoxylation |
|---|---|
| Ratio OPE/Copolymer | Penetration time (seconds) |
| 0/100 | 330 |

To assist the artisan in interpreting these results, the present inventor's interpretation thereof is presented in the graph in FIG. 1 which contains a plot of penetration time vs. treatment composition. The phantom line is a straight line drawn between the end points represented by OPE alone and copolymer alone. In the absence of enhanced results, the various combinations of OPE and copolymer should yield results which, when plotted, should approximate this straight line. The circled points in the graph represent the actual results (shown in Table 1) obtained from the various compositions. The area between the solid curved line, drawn approximately through these circled points, and the phantom line demonstrates the difference between the predicted results and those actually observed. The difference is considered to represent enhanced and unexpected results.

EXAMPLE 3

The industrial dust sample utilized in this test was —400 mesh sinter dust. The treatment composition was a 1% (total actives by weight) aqueous solution of OPE having 7.5 moles of ethoxylation and copolymer having a molecular weight of 13,300 and 70% ethoxylation. The results are reported in Table 2 below and in FIG. 2 of the accompanying drawings also in terms of penetration time vs. composition.

TABLE 2

| Copolymer: MW=13,300 70% ethoxylation | OPE: 7.5 moles ethoxylation |
|---|---|
| Ratio OPE/copolymer | Penetration time (seconds) |
| 100/0 | 75 |
| 95/5 | 71 |
| 75/25 | 69 |
| 50/50 | 80 |
| 5/95 | 196 |
| 0/100 | 620 |

Figure 2:
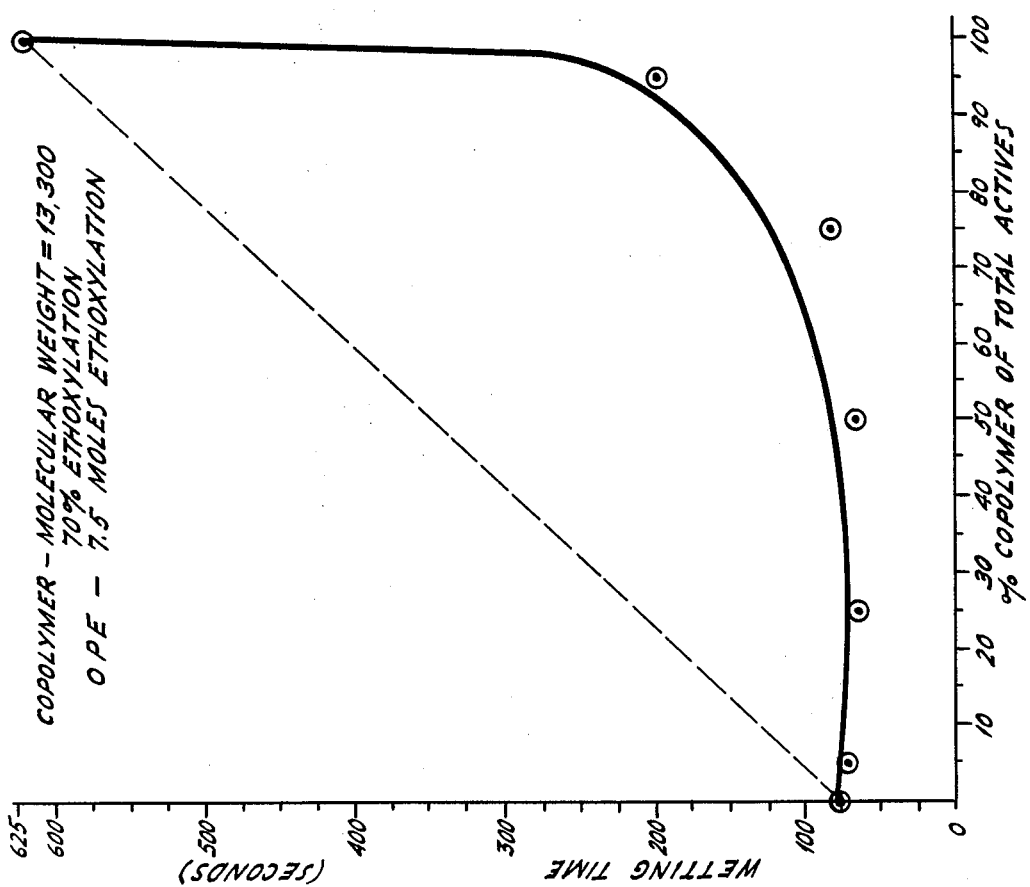

As can be seen from Table 2, particularly in conjunction with the graph in FIG. 2, the combination of the copolymer and OPE unexpectedly enhanced the dust wetting efficacy as compared to that of either component considered alone.

EXAMPLE 4

The dust utilized in this test was also —400 mesh sinter. The treatment composition was a 1% (total actives by weight) aqueous solution of OPE having 10 moles of ethoxylation and copolymer having a molecular weight of 2900 and 40% ethoxylation. The results are reported in Table 3 below and accompanying FIG. 3 in terms of penetration time vs. composition.

TABLE 3

| Copolymer: MW=2900 40% ethoxylation | OPE: 10 moles ethoxylation |
|---|---|
| Ratio OPE/copolymer | Penetration time (seconds) |
| 100/0 | 18 |
| 95/5 | 16 |
| 75/25 | 16 |
| 50/50 | 7 |
| 25/75 | 6 |
| 5/95 | 6 |
| 0/100 | 22 |

EXAMPLE 5

The treatment composition was treated on —400 mesh sinter dust and was a 1% (total actives by weight) aqueous solution of OPE having 12.5 moles of ethoxylation and copolymer having a molecular weight of 6900 and 70% ethoxylation. The results are reported in Table 4 below and in FIG. 4.

TABLE 4

| Copolymer: MW=6900 70% ethoxylation | OPE: 12.5 moles ethoxylation |
|---|---|
| Ratio OPE/copolymer | Penetration time (seconds) |
| 100/0 | 85 |
| 95/5 | 66 |
| 75/25 | 60 |
| 50/50 | 153 |
| 25/75 | 200 |
| 5/95 | 275 |
| 0/100 | 385 |

EXAMPLE 6

Figure 5:
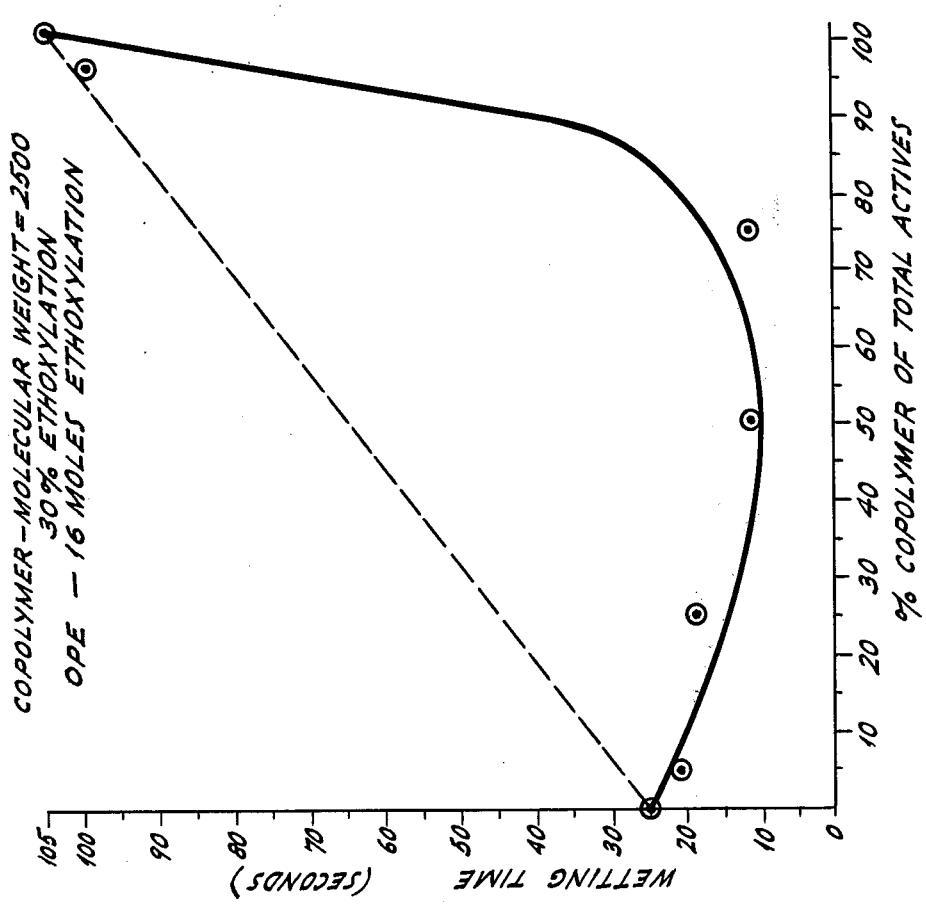

A 1% (total actives by weight) aqueous solution of OPE having 16 moles of ethoxylation and copolymer having a molecular weight of 2500 and 30% ethoxylation was tested on —400 mesh sinter dust. The results of the test are reported in Table 5 below and in FIG. 5. It can be seen from these results that the combination of the copolymer and OPE demonstrated enhanced results with respect to wetting the test dust.

TABLE 5

| Copolymer: MW=2500 30% ethoxylation | OPE: 16 moles ethoxylation |
|---|---|
| Ratio OPE/copolymer | Penetration time (seconds) |
| 100/0 | 24 |
| 95/5 | 20 |
| 75/25 | 18 |
| 50/50 | 11 |
| 25/75 | 12 |
| 5/95 | 100 |
| 0/100 | 105 |

EXAMPLE 7

Figure 6:
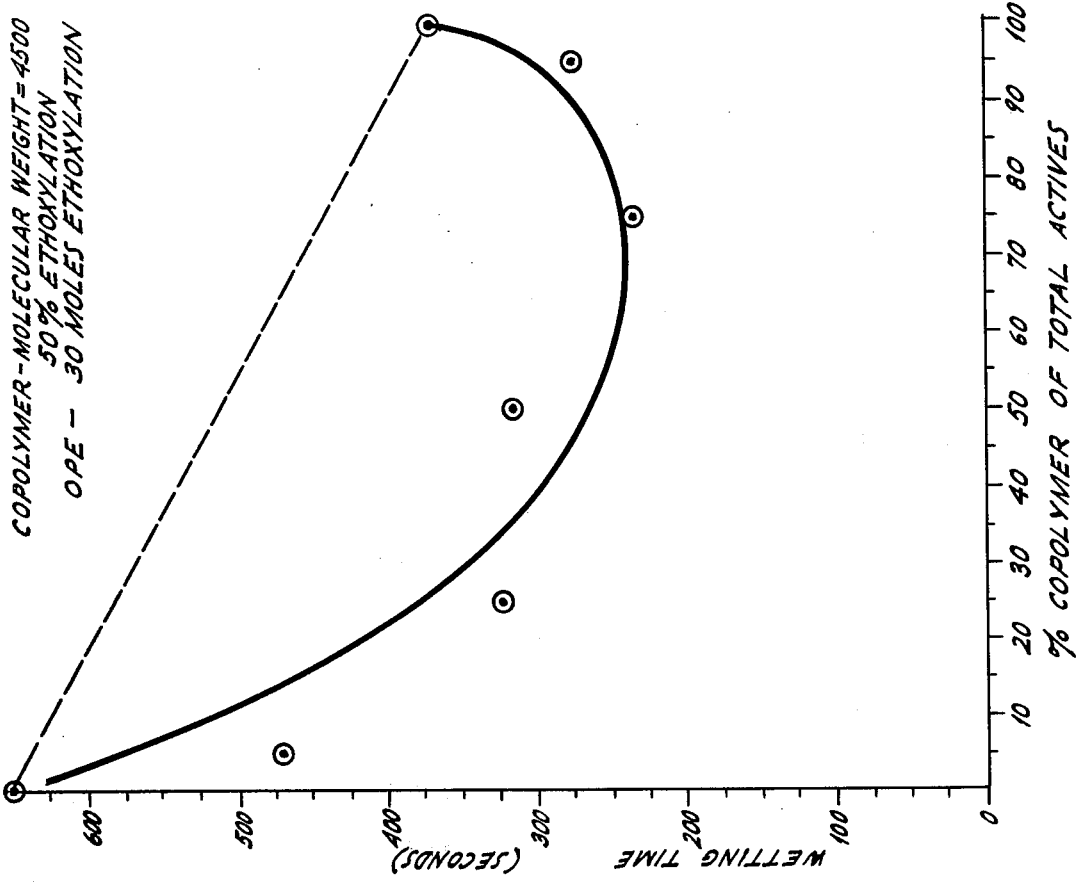

In this test a 1% aqueous solution of OPE having 30 moles ethoxylation and copolymer having a molecular weight of 4500 and 50% ethoxylation was applied to —325/+400 mesh sinter dust. The results of this test are reported below in Table 6 and in the graph in FIG. 6.

TABLE 6

| Copolymer: MW=4500 50% ethoxylation | OPE: 30 moles ethoxylation |
|---|---|
| Ratio OPE/copolymer | Penetration time (seconds) |
| 100/0 | 650 |
| 95/5 | 470 |
| 75/25 | 320 |
| 50/50 | 315 |
| 25/75 | 235 |
| 5/95 | 275 |
| 0/100 | 370 |

EXAMPLE 8

Figure 7:
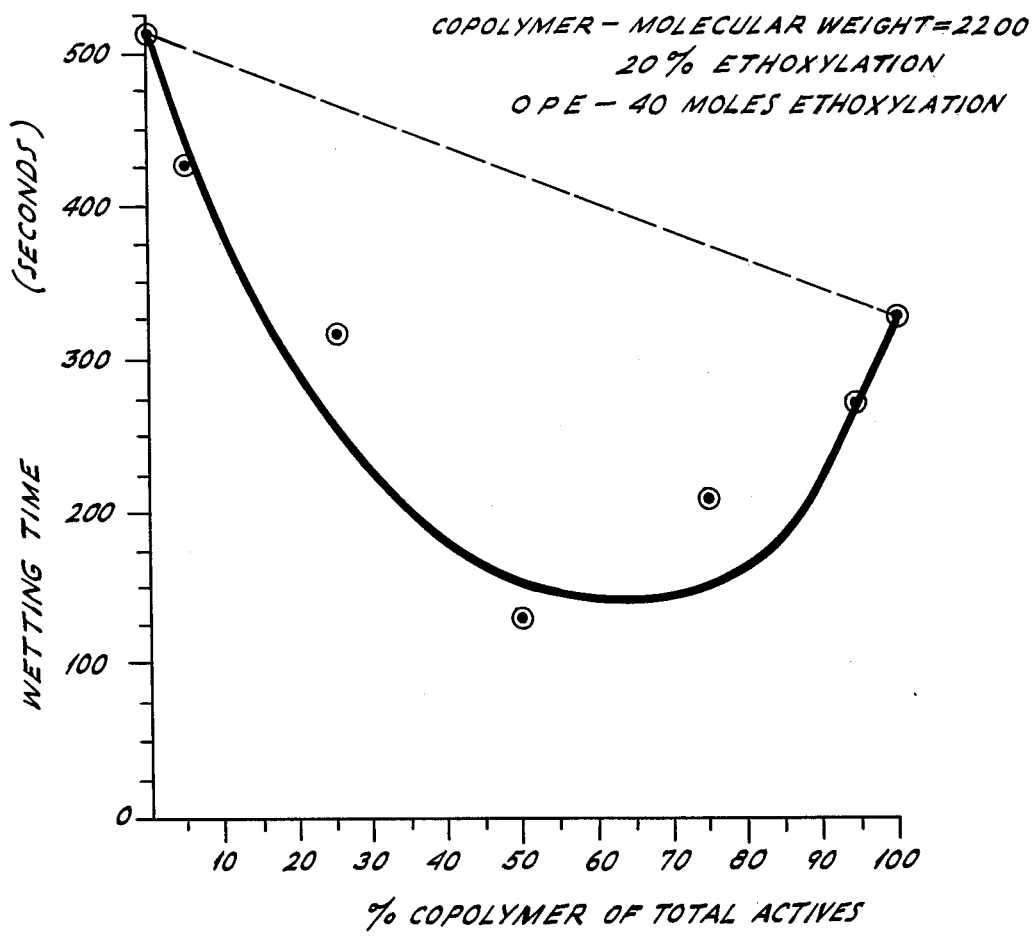

In this test a 1% aqueous solution of OPE having 40 moles ethoxylation and copolymer having a molecular weight of 2200 and 20% ethoxylation was tested on —400 mesh sinter dust. The results are reported in Table 7 below and in FIG. 7.

TABLE 7

| Copolymer: MW=2200 20% ethoxylation | OPE: 40 moles ethoxylation |
|---|---|
| Ratio OPE/copolymer | Penetration time (seconds) |
| 100/0 | 515 |
| 95/5 | 435 |
| 75/25 | 319 |
| 50/50 | 132 |
| 25/75 | 209 |
| 5/95 | 270 |
| 0/100 | 330 |

As noted above, the results of the above-reported tests (the results of which are expressed in penetration times) were found to correlate well with actual field trials. Although some of the penetration times are rather long, it should be kept in mind that the reported times are merely relative in that they point out the enhanced wetting abilities of the combination of the copolymer and OPE as compared to the components alone. While the difference in penetration times between the components alone and the combinations correlate with comparative dust particle wetting efficacies the individual penetration times considered alone bear no direct relationship to the wetting of the dust particles for purposes of this disclosure.

EXAMPLE 9

In Examples 2-8 above, the inventive composition was tested as a 1% solution. To demonstrate its efficacy over a broader range of concentrations, the composition was tested as 0.05%, 0.1%, 2% and 6% aqueous solutions. The results are reported in Tables 8-11 below. The dust was −400 mesh sinter dust. The OPE component of the composition tested had 16 moles of ethoxylation and the copolymer thereof had a molecular weight of 2500 and 30% ethoxylation (same composition as reported in Example 6 above).

TABLE 8

| 0.05% Aqueous Solution | |
|---|---|
| Ratio OPE/copolymer | Penetration time (seconds) |
| 100/0 | 1255 |
| 75/25 | 893 |
| 50/50 | 762 |
| 25/75 | 950 |
| 0/100 | 1130 |

TABLE 9

| 0.1% Aqueous Solution | |
|---|---|
| Ratio OPE/copolymer | Penetration time (seconds) |
| 100/0 | 845 |
| 75/25 | 534 |
| 50/50 | 496 |
| 25/75 | 752 |
| 0/100 | 956 |

TABLE 10

| 2% Aqueous Solution | |
|---|---|
| Ratio OPE/copolymer | Penetration time (seconds) |
| 100/0 | 4.8 |
| 75/25 | 2.1 |
| 50/50 | 2.5 |
| 25/75 | 1.9 |
| 0/100 | 3.6 |

TABLE 11

| 6% Aqueous Solution | |
|---|---|
| Ratio OPE/Copolymer | Penetration time (seconds) |
| 100/0 | 3.9 |
| 75/25 | 3.6 |
| 50/50 | 2.6 |
| 25/75 | 3.2 |
| 0/100 | 3.4 |

Although it would appear from the test results of Table 11 that the benefits of the inventive composition are uncertain, as noted above at that concentration significant stability and cost problems exist.

EXAMPLE 10

In Example 4 above, the octylphenoxy polyethoxy ethanol component of the inventive composition had 10 moles of ethoxylation and was tested in combination with copolymer having a molecular weight of 2900 and 40% ethoxylation. In Table 12 below the results are reported for various tests in which the OPE component described in Example 4 was combined with copolymers of ethylene oxide and propylene oxide having different molecular weights and degrees of ethoxylation. The solutions tested were 1% aqueous solutions and the test dust was −400 mesh sinter dust.

Even though the same OPE was used and the copolymers were varied, it can be seen from the results in Table 12 that enhanced results were still demonstrated with respect to relative dust particle wetting.

Copolymer tested in combination with same OPE having 10 moles of ethoxylation

| Molecular Weight of Copolymer | Degree of Ethoxylation (%) | OPE = Copolymer | PENETRATION TIMES (Seconds) | | | | | | |
|---|---|---|---|---|---|---|---|---|---|
| | | | 100/0 | 95/5 | 75/25 | 50/50 | 25/75 | 5/95 | 0/100 |
| 2200 | 20 | | 18 | 15 | 17 | 19 | 82 | 89 | 330 |
| 2500 | 30 | | 18 | 17 | 13 | 17 | 75 | 93 | 105 |
| 6900 | 70 | | 18 | 16 | 23 | 109 | 169 | 185 | 385 |
| 13,300 | 70 | | 18 | 12 | 19 | 113 | 143 | 200 | 620 |
| 16,200 | 80 | | 18 | 17 | 23 | 28 | 115 | 205 | 385 |
| 4500 | 50 | | 18 | 16 | 18 | 41 | 84 | 114 | 370 |

EXAMPLE 11

The preceding examples are seen to demonstrate that, as relates to dust particles, the addition of the copolymer component of the inventive composition to the OPE component unexpectedly enhances the wetting properties of the latter component. This discovery was field tested in an industrial steel mill where the dust from the discharge of the BOF furnace at the mill was collected by an electrostatic precipitator located at the top of the furnace. The dust removed by the precipitator was transferred to a silo from which it was dumped into railroad cars. It was at this dumping site that fugitive dust loading was observed in amounts of 15–16 mg. dust/ft$^3$. In an effort to reduce this dust load, a ring of spray nozzles was located between the silo and the railroad car and the dust was dumped through the ring as water was sprayed on the dust from the nozzles. The ring consisted of six nozzles each having a full cone spray pattern covering about 75 degrees of arc. The dust loads were measured using a high volume sampler which was placed about 15 feet above the top of the railroad car and was operated 3–5 minutes at 50 standard cubic feet per minute (scfm) while the silo was being unloaded. Fifty tons of dust were dumped through the spray ring in 50 minutes. The water pressure was varied between 0–35 pound per square inch (psi) and the water volume was varied between 0–600 gallons per hour (gph). The test results are reported below in Table 13 in terms of dust load (concentration of fugitive dust). The inventive composition (Product A) consisted of the following:

Ethylene glycol; 3%
OPE; 15%
Copolymer; 5%
Water; 77%

The OPE had 10 moles of ethoxylation and the copolymer had a molecular weight of 1950 and 10% ethoxylation. The ethylene glycol was used merely as a solution stabilizer for purposes of long term product stability. The treatment was added by supplying an aqueous solution of the OPE/copolymer to a water supply line to the nozzles. For comparison, the fugitive dust was also treated with water alone and a 0.264% aqueous solution of the OPE alone having 10 moles of ethoxylation (Product X).

TABLE 13

Product A: Inventive Composition, 0.2% actives
Product X: OPE component tested alone

| Treatment | Water Pressure (psi) | Concentration of Fugitive Dust (mg/ft$^3$) |
|---|---|---|
| Water | 5 | 14 |
| Product X | 5 | 8 |
| Product A | 5 | 1.5 |
| Water | 10 | 8 |
| Product X | 10 | 3 |
| Product A | 10 | less than 1 |

From these results it can be seen that the addition of the copolymer to the OPE component ehance the fugitive dust control properties of the OPE, as was predicted from the test results of the preceding examples.

EXAMPLE 12

The inventive composition described in Example 11 was field tested in the sinter cooler area of a second steel mill. The sinter dust was being dumped from the cooler into a dumping car. It was at this dumping site that high levels of fugitive dust were observed. Three spray nozzles were located beneath the cooler and sprayed into the dumping car in an attempt to alleviate this dust problem. Each nozzle produced a spray pattern covering about 180° of arc. A high volume sampler was again used to measure the dust loads. For comparison, the dust was treated with water alone and first and second aqueous solutions of the OPE having 10 moles of ethoxylation. The first aqueous solution, Product Y, contained 0.09% OPE; and the second, Product Z, contained 0.26% of the same. The results are reported in Table 14 below in terms of concentration of dust. The water pressures reported are those for the water supplied to the nozzles.

TABLE 14

Product A: Inventive Composition, 0.2% actives
Product Y: 0.09% Aqueous Solution of OPE
Product Z: 0.26% Aqueous Solution of OPE

| Treatment | Water Pressure (psi) | Concentration of Fugitive Dust (mg/ft$^3$) |
|---|---|---|
| Water | 10 | 7.5 |
| Product Y | 10 | 3.2 |
| Product Z | 10 | 2.9 |
| Product A | 10 | 2.3 |
| Water | 50 | 2.2 |
| Product Y | 50 | 1.9 |
| Product X | 50 | 1.5 |
| Product A | 50 | less than 1 |

Having thus described my invention, I claim:

1. A method for enhancing the reduction of the dissemination of fugitive dust particles into the atmosphere comprising: treating the dust particles with an effective amount for the purpose of an aqueous solution of octylphenoxy polyethoxy ethanol and copolymer of ethylene oxide and propylene oxide, wherein the weight ratio of the ethanol compound to the copolymer is from about 5/95 to 95/5, wherein the copolymer has a molecular weight of from about 1000 to 16,000 and an ethylene oxide content of from about 10% to 80%, wherein the ethanol compound has from about 5 to 40 moles of ethylene oxide, and wherein the total concentration of the ethanol compound and the copolymer in the aqueous solution is from about 0.005% to 6%.

2. The method of claim 1, wherein the treatment is applied by spraying.

3. The method of claim 2, wherein the treatment also consists essentially of an effective amount for the purpose of a solution stabilizer.

4. The method of claim 3, wherein the stabilizer is ethylene glycol.

5. The method of claim 2, wherein the fugitive dust particles are discharged from a basic oxygen furnace.

6. The method of claim 4, wherein the fugitive dust particles are discharged from a basic oxygen furnace.

7. The method of claim 2, wherein the fugitive dust particles are sinter dust.

8. The method of claim 4, wherein the fugitive dust particles are sinter dust particles.

9. The method of claim 1, wherein the copolymer has a molecular weight of from about 1950 to 13,300.

10. The method of claim 2, wherein the copolymer has a molecular weight of from about 1950 to 13,300.

11. The method of claim 5, wherein the copolymer has a molecular weight of from about 1950 to 13,300.

12. The method of claim 7, wherein the copolymer has a molecular weight of from about 1950 to 13,300.

13. The method of claim 1, wherein the treatment is applied by spraying it onto airborne dust particles.

14. A composition for enhancement of the reduction of the dissemination of fugitive dust into the atmosphere comprising an aqueous solution of:

octylphenoxy polyethoxy ethanol, and copolymer of ethylene oxide and propylene oxide, wherein the total concentration of the ethanol compound and the copolymer in the aqueous solution is from about 0.005% to 6%, the copolymer has a molecular weight of from about 1000 to 16,000 and an ethylene oxide content of from about 10% to 80%, the ethanol compound has from about 5 to 40 moles of ethylene oxide, and wherein the weight ratio of the ethanol compound to the copolymer is from about 5/95 to 95/5.

15. The composition of claim 14, wherein the total concentration of the ethanol compound and the copolymer in the aqueous solution is from about 0.05 to 2%.

16. The composition of claim 14, further comprising an effective amount for the purpose of a solution stabilizer.

17. The composition of claim 16, wherein the stabilizer is a lower alkylene glycol.

18. The composition of claim 17, wherein the stabilizer is ethylene glycol.

19. The composition of claim 18, wherein the ethanol compound comprises 15% of the composition, the copolymer comprises 5% of the composition, the ethylene glycol comprises 3% of the composition, and the water comprises 77% thereof.

20. The composition of claim 14, wherein the copolymer has a molecular weight of from about 1950 to 13,300.

21. A composition for enhancement of the reduction of the dissemination of fugitive dust into the atmosphere consisting of an aqueous solution of:
  octylphenoxy polyethoxy ethanol, copolymer of ethylene oxide and propylene oxide, and solution stabilizer,
wherein the weight ratio of the ethanol compound to the copolymer is from about 5/95 to 95/5, the copolymer has a molecular weight of from about 1000 to 16,000 and an ethylene oxide content of from about 10% to 80%, the ethanol compound has from about 5 to 40 moles of ethylene oxide, and wherein the total concentration of the ethanol compound and the copolymer in the aqueous solution is from about 0.005% to 6%.

* * * * *